(12) United States Patent
Bayer et al.

(10) Patent No.: US 6,898,934 B1
(45) Date of Patent: May 31, 2005

(54) EXTERNAL BLOW OFF CONVERSION OF COMPRESSOR RECIRCULATION VALVE

(75) Inventors: Ethan Bayer, Lake Orion, MI (US); Jack Kulick, Oak Park, MI (US); Peter Szadyr, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/740,204

(22) Filed: Dec. 18, 2003

Related U.S. Application Data

(60) Provisional application No. 60/523,073, filed on Nov. 18, 2003.

(51) Int. Cl.[7] ............................................. F02B 37/10
(52) U.S. Cl. ........................ 60/605.1; 60/611; 123/564
(58) Field of Search .............................. 60/605.1, 600, 60/607, 608, 611; 123/565

(56) References Cited

U.S. PATENT DOCUMENTS 4,429,532 A * 2/1984 Jakuba ...................... 60/605.1
5,526,645 A * 6/1996 Kaiser ......................... 60/611
6,722,128 B1 * 4/2004 Adrian ........................ 60/611

* cited by examiner

Primary Examiner—Sheldon J Richter
(74) Attorney, Agent, or Firm—Ralph E. Smith

(57) ABSTRACT

A method and apparatus provide external blow-off in a turbocharger having an internal recirculation valve configured for attachment to a valve mounting flange defining a recirculation valve inlet port connected in fluid communication with an outlet of a compressor of the turbocharger, and a recirculation valve outlet port connected to an inlet of the compressor, through use of an external blow-off adaptor that is configured for installation between the internal recirculation valve and the valve mounting flange. The external blow-off adapter is configured for producing a desirable sound when the recirculation valve is operating in the recirculation mode with the external blow-off adaptor installed between the recirculation valve and the valve mounting flange.

16 Claims, 4 Drawing Sheets

EXTERNAL BLOW OFF CONVERSION OF COMPRESSOR RECIRCULATION VALVE

CROSS-REFERENCE TO RELATED APPLICATIONS

This application claims the benefit of U.S. Provisional Patent Application Ser. No. 60/523,073, filed Nov. 18, 2003.

STATEMENT REGARDING FEDERALLY SPONSORED RESEARCH

Not applicable.

BACKGROUND OF THE INVENTION

1. Field of the Invention

The invention relates to compressors, and more particularly to compressors of the type used for turbocharging engines, where the turbocharger includes an internal recirculation valve.

2. Description of Related Art

Turbochargers have been used for many years for enhancing the performance of engines used in vehicles, such as automobiles, pick-up trucks, sport utility vehicles, and tractors.

As shown in FIG. 1, such turbochargers 10 typically include a turbine 12 driven by exhaust gas from the engine 14, and a compressor 16 driven by the turbine 12 of the turbocharger 10. The compressor 16 has an inlet 18 for ingesting air at atmospheric pressure, and an outlet 20 connected to an engine air intake 22 for providing a flow of pressurized air to the engine 14.

During certain operations, such as shifting gears in a transmission attached to the engine, when the vehicle operator releases pressure on the accelerator pedal of the vehicle, the compressor becomes unloaded, and can experience undesirable forces on blades of the compressor that could lead to premature failure of the compressor. To address this potential problem, turbochargers often include an internal recirculation valve 24 that is actuated, when needed, to provide an internal recirculation path, through the recirculation valve 24, connecting the outlet 20 of the compressor 16 back to the inlet 18 of the compressor. The recirculation is done internally to reduce the generation of sounds, during recirculation, which might be objectionable to the vehicle operator.

FIG. 2 shows one commonly used type of internal recirculation valve 24. The valve 24, shown in FIGS. 2–3, includes a housing 26 having a lower edge (as shown in FIG. 2) adapted for bolted attachment to a valve mounting flange 28, with three screws 27. The valve mounting flange 28 includes a generally planar face 30, thereof, and defines a recirculation valve inlet port 32 and a recirculation valve outlet port 34. The recirculation valve inlet port 32 is operatively connected in fluid communication with the compressor outlet 20, and the recirculation valve outlet port 34 is operatively connected in fluid communication to the compressor inlet 18. A gasket (not shown) may be used for sealing the juncture between the housing 26 of the recirculation valve 24 and the face 30 of the valve mounting flange 28.

FIG. 3 is a schematic cross-sectional representation of the interior of the recirculation valve 24, with the valve 24 mounted on the mounting flange 28. The housing 26 of the recirculation valve 24, and a movable diaphragm 36 define an internal fluid cavity 38, having an inlet/outlet 40 adapted for connection to a source of vacuum and air pressure. The diaphragm 36 includes a poppet 42, often fabricated from plastic, centered over the compressor outlet port 34 of the valve mounting flange 28, for blocking a flow of pressurized air through the recirculation valve 24 into the recirculation valve outlet port 34, when the diaphragm 36 is positioned such that the poppet 42 is seated against the face 30 of the mounting flange 28. The recirculation valve also includes a compression spring 44 for biasing the poppet 42 toward contact with the mounting flange 28.

When the recirculation valve 24 is operating in a recirculation mode, a vacuum is applied to the inlet/outlet 40, to pull the diaphragm 36 and poppet 42 away from the face 30 of the mounting flange 28, to thereby provide a fluid connection between the recirculation valve inlet and the outlet 32, 34 of the mounting flange 28, and allow recirculation of air through the recirculation valve 24 from the compressor outlet 20 to the compressor inlet 18.

When the recirculation valve is operated in a non-recirculation mode, pressurized air is applied to the inlet/outlet 40, to aid the spring 44 in holding the diaphragm 36 and poppet 42 against the surface 30 of the mounting flange 28, to thereby block recirculation through the recirculation valve 24.

Although recirculation is normally carried out internally to the recirculation valve 24, as described above, to reduce the generation of sounds during recirculation, which might be objectionable to the vehicle operator, there are those who desire to have the recirculation valve outlet 34 vent externally, when the recirculation valve is operating in the recirculation mode, to generate a desired sound, such as a whine, instead of having internal recirculation. In the past, aftermarket manufacturers have sold kits including a venting valve that replaces the original equipment manufacturers (OEM) recirculation valve, together with such altered compressor air manifolds and controls for the venting valve as may be required for operation of the venting valve. Such kits are relatively expensive, and may require replacement of the OEM parts, and altering operation in a manner that adversely affects operation and life of the turbocharger.

It is desirable, therefore, to provide an improved apparatus and method for providing external venting of a turbocharger compressor having an internal recirculation valve, or converting an existing internal recirculation valve on a turbocharger to vent externally. It is highly desirable that such an improved apparatus and method be provided in a manner requiring minimal modification of the OEM turbocharger, the recirculation valve, associated controls and air ducting, and in a manner that can be implemented at a lower cost than prior approaches to providing external venting of the turbocharger compressor.

BRIEF SUMMARY OF THE INVENTION

A method and apparatus, according to the invention, provide external blow-off in a turbocharger compressor having an internal recirculation valve configured for attachment to a valve mounting flange defining a recirculation valve inlet port, operatively connected to an outlet of the compressor, and a recirculation valve inlet port, operatively connected to an inlet of the compressor, through use of an external blow-off adaptor that is configured for installation between the recirculation valve and the valve mounting flange. The external blow-off adapter may be configured for producing a desirable sound, when the recirculation valve is operating in the recirculation mode, with the external blow-off adaptor installed between the recirculation valve and the valve mounting flange.

In one embodiment, the method includes separating the recirculation valve from the valve flange, inserting the external blow-off adaptor between the recirculation valve and the valve mounting flange, and clamping the external blow-off adaptor between the recirculation valve and the valve mounting flange. Practicing the invention in this manner provides the desired external blow-off, with minimal disturbance of OEM equipment.

In a further embodiment, an external blow-off conversion apparatus is provided, for a turbocharger compressor recirculation valve adapted for attachment to a valve mounting flange defining a recirculation valve inlet port and a recirculation valve outlet. The recirculation valve inlet port is operatively connected in fluid communication with an outlet of the compressor, to receive compressed air therefrom, and the recirculation valve outlet port is operatively connected in fluid communication with an inlet of the compressor. Without the external blow-off conversion apparatus, the recirculation valve inlet and outlet ports are selectively connected to one another by the recirculation valve when the recirculation valve is operating in a recirculation mode, to thereby provide internal recirculation through the recirculation valve from the compressor outlet to the compressor inlet, and disconnected from one another by the recirculation valve when recirculation valve is not operating in the recirculation mode, to thereby block internal recirculation through the recirculation valve between the compressor outlet and the compressor inlet.

The external blow-off apparatus includes an external blow-off adaptor having a body configured for mounting between the recirculation valve and the valve mounting flange, and a wall blocking the recirculation valve outlet port of the valve mounting flange. The wall may be provided by a gasket disposed between the adaptor body and the valve mounting flange, or alternatively as an integral part of the body.

The body of the external blow-off adaptor defines an inlet passage providing fluid communication between the recirculation valve inlet port of the flange and the recirculation valve, a blow-off vent, and a blow-off passage providing fluid communication between the recirculation valve and the blow-off vent. The wall, in conjunction with the blow-off passage of the body of the external blow-off adaptor define an air pathway that blocks internal recirculation between the compressor inlet and outlet ports, regardless of whether the recirculation valve is operating in the recirculation mode or the non-recirculation mode, and directs a flow of air from the recirculation valve to the blow-off vent when the recirculation valve is operating in the recirculation mode.

A further embodiment includes a recirculation valve controller adapted for operative connection to the recirculation valve for controlling the recirculation valve with the external blow-off adaptor installed between the recirculation valve and the valve mounting flange, but will preferably utilize an OEM controller already present for controlling the turbocharger recirculation valve.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
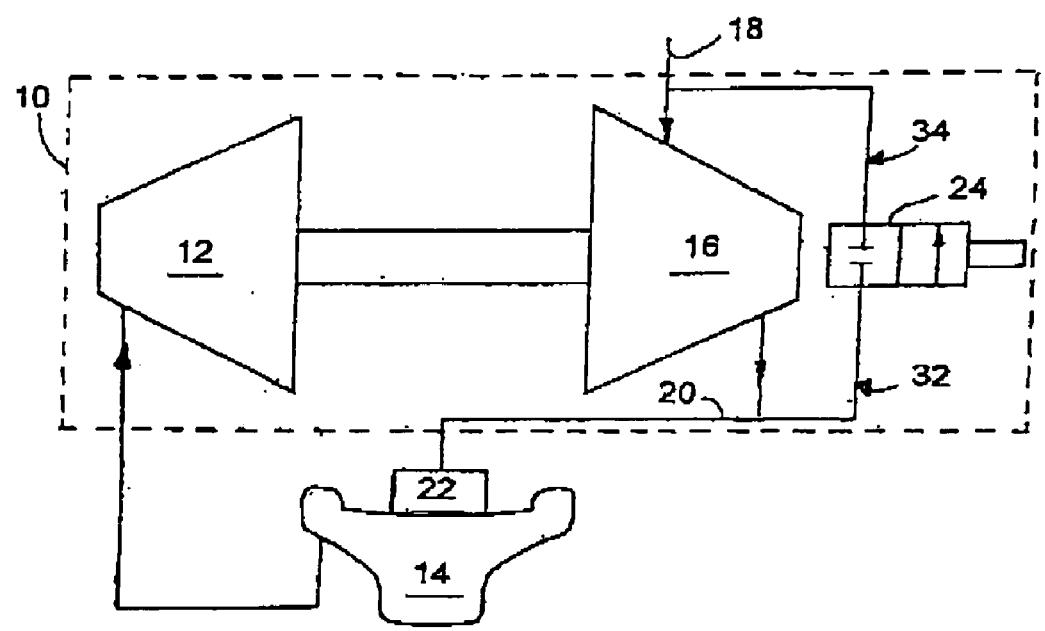
FIG. 1 is a schematic showing a prior internal recirculation arrangement for a turbocharger supplying compressed air to an air intake of an engine.
Figure 3:
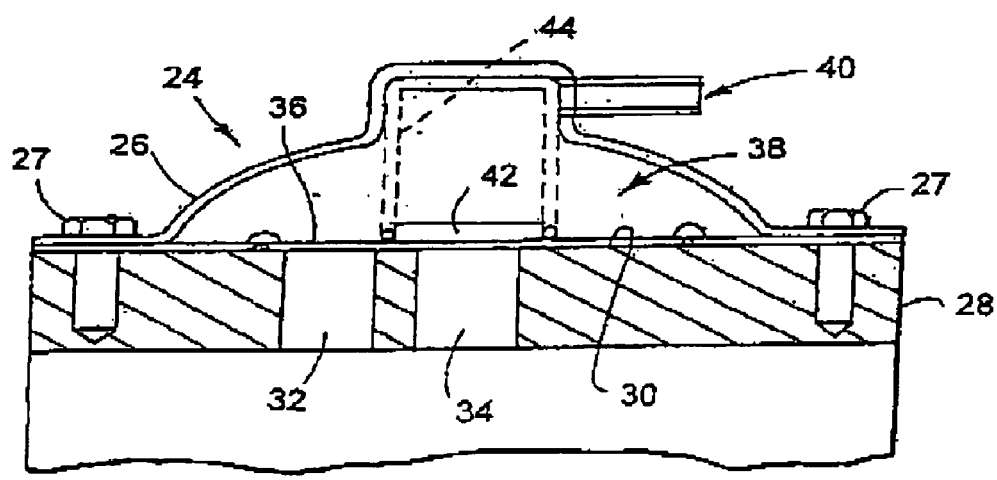
FIG. 3 is a schematic cross section of the recirculation valve and valve mounting flange of FIG. 2.
Figure 2:
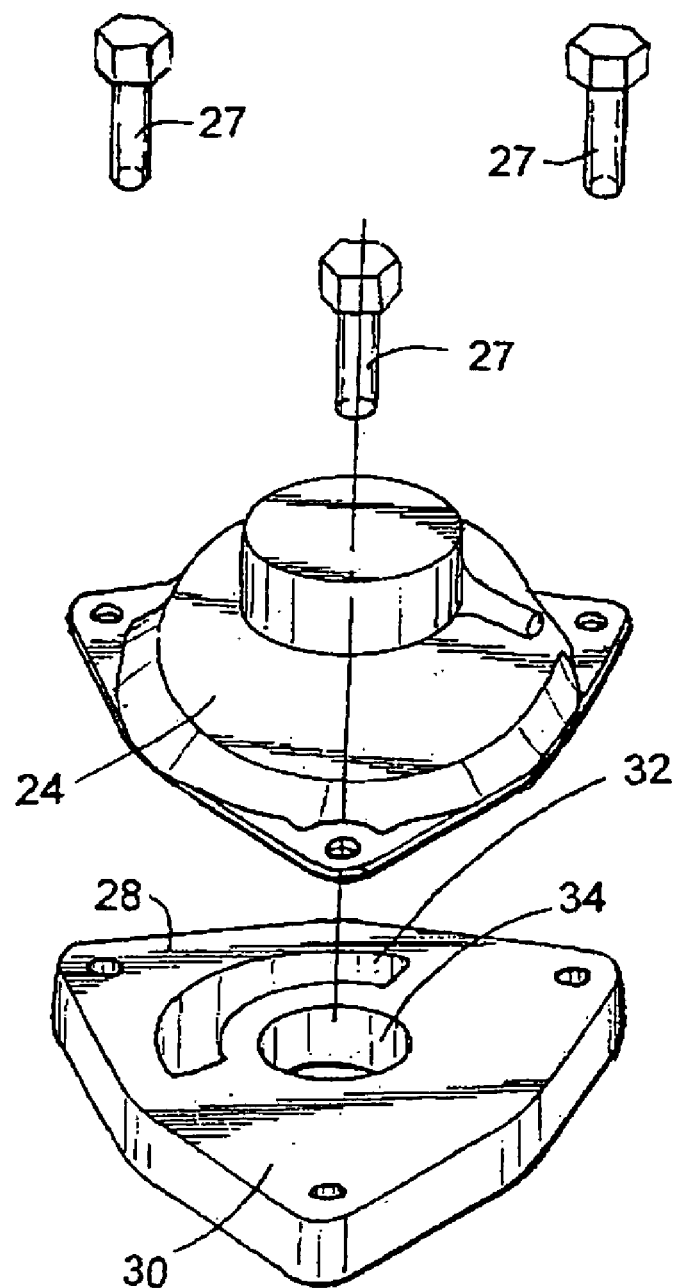
FIG. 2 is an exploded perspective view of a prior recirculation valve and a valve mounting flange arrangement for providing internal recirculation in the compressor of a turbocharger.
Figure 4:
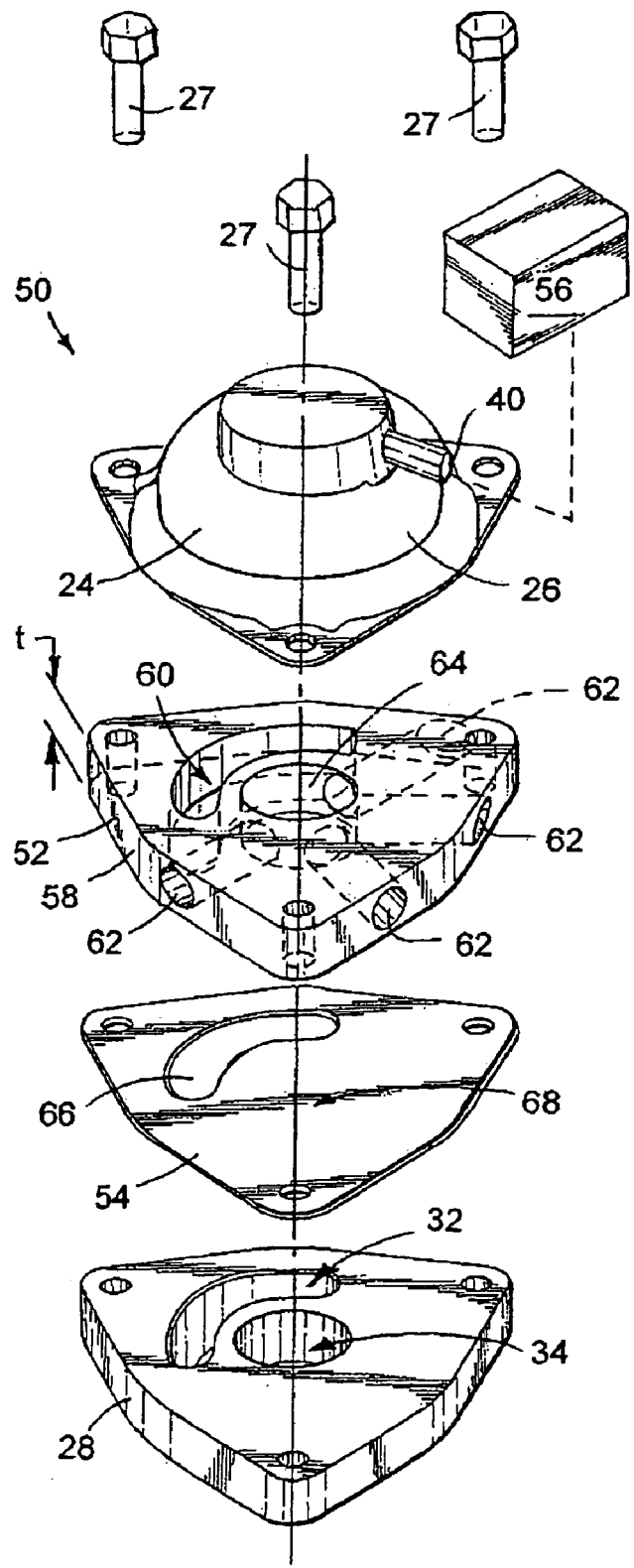
FIG. 4 is an exploded perspective view of an external blow-off apparatus according to the invention.
Figure 5:
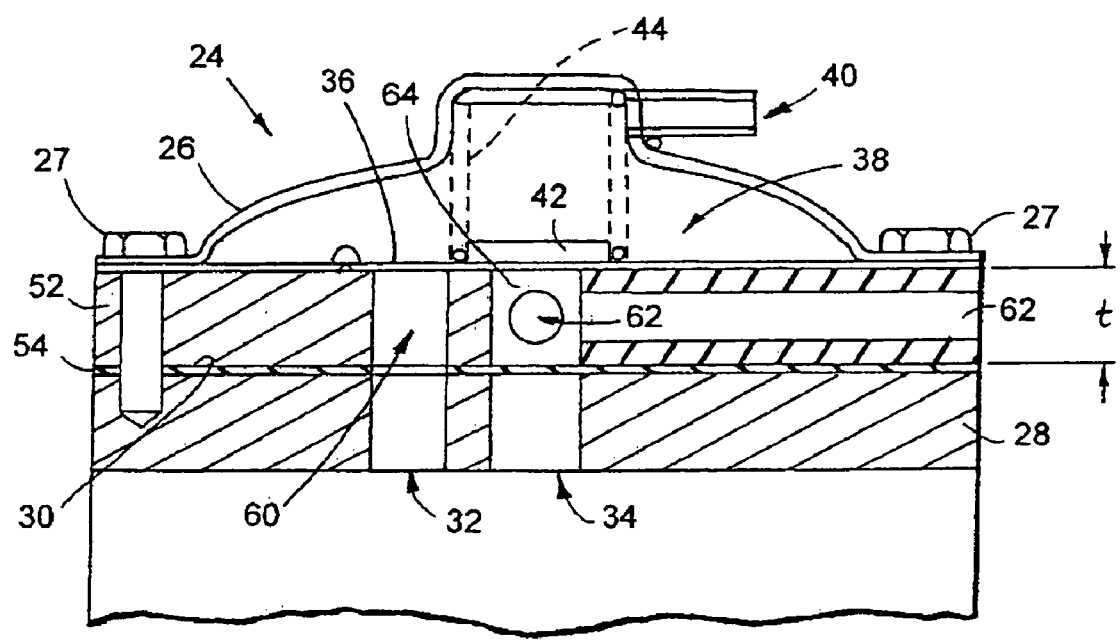
FIG. 5 is a schematic cross section of the external blow-off apparatus of FIG. 4.
Figure 6:
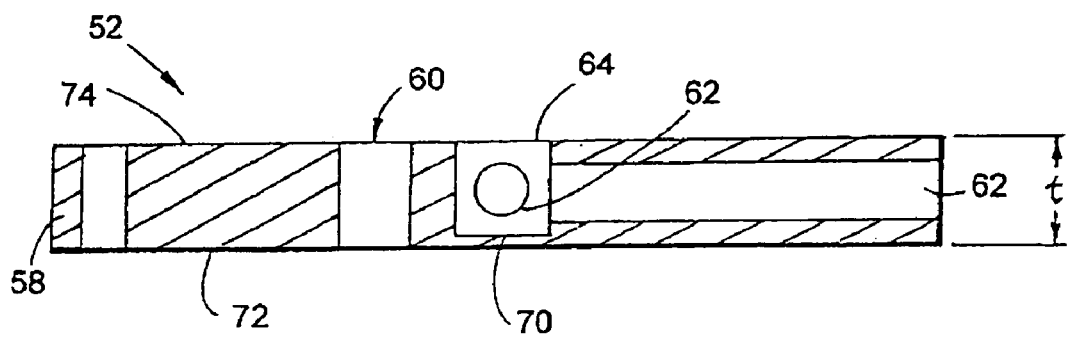
FIG. 6 is a schematic cross section of a further embodiment of an external blow-off adaptor according to the invention.

FIGS. 4–6 show an exemplary embodiment of an external blow-off conversion apparatus 50, for a turbocharger compressor recirculation valve 24 adapted for attachment to a valve mounting flange 28 defining a recirculation valve inlet port 32 and a recirculation valve outlet port 34. By way of example, the recirculation valve 24 and valve mounting flange 28 shown in FIGS. 4 and 5 are identical in form and function to the valve shown in FIGS. 2 and 3, but this should not be considered limiting of the invention. The recirculation valve inlet port 32 is connected in fluid communication to an outlet 20 of the turbocharger compressor 16, and the recirculation valve outlet port 34 is connected to an inlet 18 of the turbocharger compressor 16, in the same manner as described above in relation to the prior turbocharger 10 shown in FIG. 1.

Without the external blow-off apparatus 50, the recirculation valve inlet and outlet ports 32, 34 are selectively connected to one another by the recirculation valve 24, in the same manner as described above in relation to FIGS. 1–3, when the recirculation valve 24 is operating in a recirculation mode, to thereby provide internal recirculation from the compressor outlet 20 to the compressor inlet 18, and disconnected from one another by the recirculation valve 24 when recirculation valve 24 is not operating in the recirculation mode, to thereby block internal recirculation through the recirculation valve 24 between the recirculation valve inlet port 32 and the recirculation valve outlet port 34.

The exemplary embodiment of the external blow-off conversion apparatus 50, shown in FIG. 4, includes an external blow-off adaptor 52, a gasket 54, and a recirculation valve controller 56 operatively connected to the recirculation valve 24. As will be appreciated from the following description, however, it will generally be considered preferable to utilize an existing OEM controller for operating the recirculation valve 24, instead of providing an aftermarket recirculation valve controller 56 as part of the external blow-off conversion apparatus 50, and to fabricate the external blow-off adaptor 52 in such a manner that the gasket 54 will not necessarily need to be provided as a part of the external blow-off conversion apparatus 50.

The external blow-off adaptor 52 includes an adaptor body 58 configured for mounting between the recirculation valve 24 and the valve mounting flange 28. The adaptor body 58 defines an inlet passage 60 providing fluid communication between the recirculation valve inlet port 32 of the flange 28 and the recirculation valve 24. The adaptor body 58 further defines four blow-off vents 62, and a blow-off passage 64 providing fluid communication between the recirculation valve 24 and the blow-off vents 62. The blow-off passage 64 directs a flow of air from the recirculation valve 24 to the four blow-off vents 62 when the recirculation valve 24 is operating in the recirculation mode.

The gasket 54 includes an inlet opening 66 that is aligned with both the recirculation valve inlet port 32 in the flange 28, and the inlet passage 60 in the external blow-off adaptor 52, to thereby allow air to flow from the recirculation valve inlet port 32 in the flange 28 into the recirculation valve 24, through the inlet passage 60 in the external blow-off adaptor 52. The gasket 54 does not, however, include an opening aligned with the recirculation valve outlet port 34 of the valve mounting flange 28. A central portion of the gasket 54 provides a wall 68 that blocks fluid communication between the recirculation valve 24 and the recirculation valve outlet port 34 of the flange 28. The wall 68 in conjunction with the blow-off passage 64 of the body 58 of the external blow-off adaptor 52 thereby define a flow path that blocks internal recirculation between the recirculation valve inlet 32 and outlet ports 34, regardless of the whether the recirculation valve 24 is operating in the recirculation mode or the non-recirculation mode, and directs a flow of air from the recirculation valve 24 to the four blow-off vents 62 when the recirculation valve 24 is operating in the recirculation mode, with the adaptor 52 clamped between the recirculation valve 24 and the valve mounting flange 28 by three mounting screws 27.

FIG. 6 shows an alternate exemplary embodiment of the external blow-off adaptor 52, wherein the adaptor body 58 further includes an integral wall 70, at the bottom of the blow-off passage 64, blocking fluid communication between the recirculation valve 24 and the compressor outlet port 34 of the flange 28. The integral wall 70 functions in the same manner as the wall 68 of the gasket 54, in conjunction with the blow-off passage 64 of the body 58 of the external blow-off adaptor 52, to thereby define a flow path that blocks internal recirculation between the recirculation valve inlet and outlet ports 32, 34, regardless of the whether the recirculation valve 24 is operating in the recirculation mode or the non-recirculation mode, and directs a flow of air from the recirculation valve 24 to the four blow-off vents 62 when the recirculation valve 24 is operating in the recirculation mode.

The wall 70 of the external blow-off adaptor 52, in the form shown in FIG. 6, replaces the central portion 68 of the gasket 52, as shown in the embodiment of FIGS. 4 and 5, in performing the function of blocking the outlet port 34 of the valve mounting flange 28, thereby allowing an OEM gasket to be used for sealing the juncture between the recirculation valve 24 and the valve mounting flange 28. The wall 70 may be formed integrally with the body 58 of the external blow-off adaptor 52, or be provided in any other appropriate manner, such as inserting a plug into the bottom of the blow-off passage 64.

The adaptor body 58 of the exemplary embodiments is a generally flat plate defining a thickness 't' of the body 58, a first planar surface 72 adapted for bearing against the valve mounting flange 28, and a second planar surface 74 adapted for receiving the recirculation valve 24. The first and second planar surfaces 72, 74 extend generally parallel to one another and are spaced from one another by the thickness t of the body 58. The blow-off passage 64 extends from the second planar surface 72 into the body 58 and terminates in the wall 70 of the adaptor body 58. The blow off vents 62 extend from the blow-off passage 64 through the thickness t of the body 58 and exits the plate between the first and second planar faces 72, 74 of the body 58.

The blow-off passage 64 extends generally perpendicularly to the second planar surface 74 into the thickness t of the plate 52, and the blow-off vents 62 extend transversely to the blow-off passage 64. The four blow-off vents 62 are straight, and extend radially from the blow-off passage 64, in the exemplary embodiments shown in FIGS. 4–6. In further embodiments of the invention, it may be desirable to have the blow-off passage 64 and/or the blow-off vents 62 take other shapes, such as curved or angled passages, to accommodate packaging the adaptor 52, or to generate a desired sound when air from the compressor is being externally vented. It may also be desirable in other embodiments of the invention to utilize more or fewer blow off passages 64 and blow-off vents 62.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A method for providing an external blow-off valve for a turbocharger compressor having a recirculation valve configured for attachment to a valve mounting flange defining a recirculation valve inlet port and a recirculation valve outlet port that are selectively connected to one another by the recirculation valve when the recirculation valve is operating in a recirculation mode, to thereby provide internal recirculation from a compressor outlet operatively connected in fluid communication with the recirculation valve inlet port to a compressor inlet operatively connected in fluid communication with the recirculation valve inlet port, and disconnected from one another by the recirculation valve when recirculation valve is not operating in the recirculation mode, to thereby block internal recirculation between the compressor outlet port and the compressor inlet port, the method comprising installing an external blow off adaptor between recirculation valve and the valve mounting flange.

2. The method of claim 1, further comprising:
separating the recirculation valve from the valve flange;
inserting the external blow-off adaptor between the recirculation valve and the valve mounting flange; and
clamping the external blow-off adaptor between the recirculation valve and the valve mounting flange.

3. A compressor recirculation valve for a turbocharger compressor comprising:
a recirculation housing;
a mounting flange supporting said recirculation housing, said mounting flange defining a valve inlet port in fluid communication with a compressor outlet and a valve outlet port in selective fluid communication with a compressor inlet; and a blow-off adaptor disposed between said recirculation housing and said mounting flange, said blow-off adaptor defining an inlet passage providing fluid communication between said valve inlet port and said recirculation housing.

4. The compressor recirculation valve of claim 3, wherein said blow-off adaptor includes at least one blow-off vent in fluid communication with said recirculation housing.

5. The compressor recirculation valve of claim 4, wherein said at least one blow-off vent is fluidly coupled to said recirculation housing by a blow-off passage, said blow-off passage formed in said mounting flange substantially parallel to said valve inlet port and said valve outlet port.

6. The compressor recirculation valve of claim 5, wherein said at least one blow-off vent extends radially from said blow-off passage, said at least one blow-off vent being substantially perpendicular to said blow-off passage.

7. The compressor recirculation valve of claim 3, further including a wall disposed between said mounting flange and said blow-off adaptor, said wall preventing fluid communication between said recirculation housing and said valve outlet port.

8. The compressor recirculation valve of claim 7, wherein said wall includes an opening aligned with said valve inlet port to allow fluid communication between said blow-off adaptor, said mounting flange, and said recirculation housing.

9. The compressor recirculation valve of claim 7, wherein said wall is integrally formed with said blow-off adaptor.

10. The compressor recirculation valve of claim 3, further including a recirculation valve controller.

11. A blow-off adaptor for a recirculation valve of a turbocharger compressor, the blow-off adaptor comprising:

a main body disposed between a recirculation housing and a mounting flange;

an inlet port formed through said main body and providing fluid communication between said recirculation housing and said mounting flange;

a blow-off passage formed through said main body and substantially parallel to said inlet port; and at least one blow-off vent in fluid communication with said blow-off passage and formed substantially perpendicular to said blow-off passage;

wherein said blow-off passage provides selective fluid communication between said recirculation housing and said at least one blow-off vent.

12. The blow-off adaptor of claim 11, wherein said at least one blow-off vent extends radially from said blow-off passage.

13. The blow-off adaptor of claim 11, further including a wall disposed between said mounting flange and said main body.

14. The blow-off adaptor of claim 13, wherein said wall includes an opening aligned with said inlet port to allow fluid communication between said blow-off adaptor, said mounting flange, and said recirculation housing.

15. The blow-off adaptor of claim 13, wherein said wall is integrally formed with said main body.

16. The blow-off adaptor of claim 11, further including a recirculation valve controller.

* * * * *